United States Patent
Holcomb et al.

(10) Patent No.: US 7,839,930 B2
(45) Date of Patent: Nov. 23, 2010

(54) SIGNALING VALID ENTRY POINTS IN A VIDEO STREAM

(75) Inventors: Thomas W. Holcomb, Bothell, WA (US); Regis J. Crinon, Camas, WA (US); Timothy E. Onders, Kirkland, WA (US); Sridhar Srinivasan, Seattle, WA (US); Shankar Regunathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1478 days.

(21) Appl. No.: 10/882,739

(22) Filed: Jun. 30, 2004

(65) Prior Publication Data

US 2005/0105883 A1 May 19, 2005

Related U.S. Application Data

(60) Provisional application No. 60/520,543, filed on Nov. 13, 2003.

(51) Int. Cl.
*H04N 7/32* (2006.01)
*H04N 3/10* (2006.01)

(52) U.S. Cl. .................. 375/240.13; 375/240.12; 348/305; 348/550

(58) Field of Classification Search .............. 386/68, 386/69, 52; 375/240.26, 240.29
See application file for complete search history.

(56) References Cited

U.S. PATENT DOCUMENTS

| | | | |
|---|---|---|---|
| 4,847,877 A | 7/1989 | Besseyre | |
| 4,969,055 A * | 11/1990 | Oberjatzas et al. | 386/111 |
| 5,023,727 A | 6/1991 | Boyd et al. | |
| 5,027,206 A | 6/1991 | Vreeswijk et al. | |
| 5,168,356 A | 12/1992 | Acampora et al. | |
| 5,175,618 A | 12/1992 | Ueda et al. | |
| 5,191,436 A | 3/1993 | Yonemitsu | |
| 5,212,549 A * | 5/1993 | Ng et al. | 375/240.15 |
| 5,223,949 A | 6/1993 | Honjo | |
| 5,293,229 A | 3/1994 | Iu | |
| 5,325,126 A | 6/1994 | Keith | |
| 5,365,552 A | 11/1994 | Astle | |
| 5,428,396 A | 6/1995 | Yagasaki et al. | |
| 5,477,397 A | 12/1995 | Naimpally et al. | |
| 5,543,847 A | 8/1996 | Kato | |

(Continued)

FOREIGN PATENT DOCUMENTS

CA 2257577 10/1998

(Continued)

OTHER PUBLICATIONS

"Packetized Elementary Stream Headers". Mar. 2004. Retrieved Apr. 2008. <http://dvd.sourceforge.net/dvdinfo/pes-hdr.html>.*

(Continued)

*Primary Examiner*—Mehrdad Dastouri
*Assistant Examiner*—David N Werner
(74) *Attorney, Agent, or Firm*—Klarquist Sparkman, LLP

(57) ABSTRACT

Techniques and tools for coding/decoding of digital video, and in particular, for determining, signaling and detecting entry points in video streams are described. Techniques and tools described herein are used to embed entry point indicator information in the bitstream that receivers, editing systems, insertion systems, and other systems can use to detect valid entry points in compressed video.

38 Claims, 7 Drawing Sheets

Entry Point Signaled before an P/I frame (Field Interlace Picture Coding)

U.S. PATENT DOCUMENTS

| | | | |
|---|---|---|---|
| 5,586,200 | A | 12/1996 | Devaney et al. |
| 5,602,956 | A * | 2/1997 | Suzuki et al. ............... 386/68 |
| 5,621,840 | A * | 4/1997 | Kawamura et al. ........... 386/68 |
| 5,661,665 | A | 8/1997 | Glass et al. |
| 5,740,310 | A | 4/1998 | De Haan et al. |
| 5,784,528 | A | 7/1998 | Yamane et al. |
| 5,835,636 | A | 11/1998 | Auld |
| 5,838,823 | A | 11/1998 | Ancessi |
| 5,838,872 | A * | 11/1998 | Kawara ...................... 386/68 |
| RE36,015 | E | 12/1998 | Iu |
| 5,864,368 | A * | 1/1999 | Kato et al. ................ 348/446 |
| 5,870,444 | A | 2/1999 | Mynett et al. |
| 5,898,897 | A | 4/1999 | Son et al. |
| 5,912,709 | A * | 6/1999 | Takahashi ............. 375/240.15 |
| 5,946,043 | A | 8/1999 | Lee et al. |
| 5,955,977 | A | 9/1999 | Lei |
| 5,956,090 | A | 9/1999 | Yamauchi |
| 5,959,796 | A | 9/1999 | Matsumi et al. |
| 5,970,173 | A | 10/1999 | Lee et al. |
| 5,973,743 | A | 10/1999 | Han |
| RE36,507 | E | 1/2000 | Iu |
| 6,018,765 | A | 1/2000 | Durana et al. |
| 6,061,399 | A * | 5/2000 | Lyons et al. ................. 375/240 |
| 6,075,576 | A | 6/2000 | Tan et al. |
| 6,169,573 | B1 | 1/2001 | Sampath-Kumar et al. |
| 6,188,428 | B1 | 2/2001 | Koz |
| 6,198,773 | B1 | 3/2001 | Gill et al. |
| 6,201,927 | B1 | 3/2001 | Comer |
| RE37,222 | E | 6/2001 | Yonemitsu et al. |
| 6,266,158 | B1 | 7/2001 | Hata et al. |
| 6,301,428 | B1 | 10/2001 | Linzer |
| 6,330,214 | B1 | 12/2001 | Ohta et al. |
| 6,380,991 | B1 | 4/2002 | Teichmer |
| 6,414,998 | B1 | 7/2002 | Yoshinari et al. |
| 6,415,326 | B1 | 7/2002 | Gupta et al. |
| 6,434,195 | B1 * | 8/2002 | Luthra et al. ............ 375/240.12 |
| 6,442,604 | B2 | 8/2002 | Romine |
| 6,453,115 | B1 * | 9/2002 | Boyle ........................ 386/68 |
| 6,470,135 | B1 * | 10/2002 | Kim et al. .................... 386/68 |
| 6,499,060 | B1 | 12/2002 | Wang et al. |
| 6,512,882 | B1 * | 1/2003 | Teunissen .................... 386/70 |
| 6,529,555 | B1 * | 3/2003 | Saunders et al. ........ 375/240.26 |
| 6,532,333 | B1 * | 3/2003 | Ito ............................ 386/52 |
| 6,567,471 | B1 * | 5/2003 | Yoshinari ............... 375/240.26 |
| 6,584,273 | B1 * | 6/2003 | Ashley et al. ................. 386/52 |
| 6,611,624 | B1 * | 8/2003 | Zhang et al. ............... 382/232 |
| 6,728,317 | B1 | 4/2004 | Demos |
| 6,735,253 | B1 | 5/2004 | Chang et al. |
| 6,765,963 | B2 | 7/2004 | Karczewicz et al. |
| 6,823,010 | B1 * | 11/2004 | Curet et al. ............. 375/240.12 |
| 6,873,629 | B2 | 3/2005 | Morris |
| 6,912,251 | B1 | 6/2005 | Ward et al. |
| 6,920,175 | B2 | 7/2005 | Karczewicz et al. |
| 6,985,188 | B1 | 1/2006 | Hurst, Jr. |
| 7,027,509 | B2 * | 4/2006 | Jun et al. ................. 375/240.16 |
| 7,164,844 | B1 | 1/2007 | Yap et al. |
| 7,177,522 | B2 | 2/2007 | MacInnis |
| 7,242,716 | B2 | 7/2007 | Koto et al. |
| 7,609,762 | B2 * | 10/2009 | Crinon et al. ............ 375/240.13 |
| 2002/0041628 | A1 * | 4/2002 | Andersson et al. ..... 375/240.12 |
| 2002/0061183 | A1 * | 5/2002 | MacInnis ..................... 386/68 |
| 2002/0163532 | A1 * | 11/2002 | Thomas et al. ............. 345/723 |
| 2003/0053416 | A1 | 3/2003 | Ribas-Corbera et al. |
| 2003/0156640 | A1 | 8/2003 | Sullivan |
| 2003/0194010 | A1 | 10/2003 | Mukerjee et al. |
| 2003/0231863 | A1 | 12/2003 | Eerenberg et al. |
| 2004/0190770 | A1 | 9/2004 | Spaulding et al. |
| 2004/0264578 | A1 | 12/2004 | Soroushian |
| 2005/0099869 | A1 * | 5/2005 | Crinon et al. ................ 365/222 |
| 2005/0111547 | A1 | 5/2005 | Holcomb et al. |
| 2005/0123274 | A1 | 6/2005 | Crinon et al. |
| 2005/0135783 | A1 | 6/2005 | Crinon et al. |
| 2005/0152448 | A1 | 7/2005 | Crinon et al. |
| 2006/0013568 | A1 | 1/2006 | Rodriguez |

FOREIGN PATENT DOCUMENTS

| | | |
|---|---|---|
| EP | 0 886 398 | 12/1998 |
| EP | 0 948 214 | 10/1999 |
| EP | 1 018 840 | 7/2000 |
| EP | 1 043 892 | 10/2000 |
| EP | 1 069 777 | 1/2001 |
| EP | 1 079 631 | 2/2001 |
| EP | 1 111 932 | 6/2001 |
| WO | WO 9927713 A2 * | 6/1999 |
| WO | WO 99/56472 | 11/1999 |
| WO | WO 00 56077 | 9/2000 |
| WO | WO 00 64186 | 10/2000 |
| WO | WO 01/35650 | 5/2001 |

OTHER PUBLICATIONS

ISO/IEC Standard 11172, Coding of Moving Pictures and Associated Audio (MPEG-1), Part 2: Video. Nov. 1991.*

U.S. Appl. No. 60/501,081, filed Sep. 7, 2003, Srinivasan et al.

U.S. Appl. No. 60/501,133, filed Sep. 7, 2003, Srinivasan et al.

Anonymous, "DivX Multi Standard Video Encoder," 2 pp. (Downloaded from the World Wide Web on Jan. 24, 2006).

Wien, "Variable Block-Size Transforms for Hybrid Video Coding," Dissertation, 182 pp. (Feb. 2004).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video!," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

U.S. Appl. No. 60/341,674, filed Dec. 17, 2001, Lee et al.

U.S. Appl. No. 60/488,710, filed Jul. 18, 2003, Srinivasan et al.

Andersen, "A Proposed Method for Creating VCR Functions using MPEG Streams," *Proc. 12th Int'l Conf. on Data Engineering (ICDE)*, pp. 380-382 (1996).

ISO/IEC, "DSM-CC FAQ Version 1.0," 12 pp. (1997) [Downloaded from the World Wide Web on Oct. 25, 2005].

ISO/IEC, "ISO/IEC 13818-6: Information Technology—Generic Coding of Moving Pictures and Associated Audio Information—Part 6: Extensions for DSM-CC," pp. ii-9, 136-147, 204, 205, 222-224, 279-290, 311-318, 399-401 (1998).

ISO/IEC, "ISO/IEC 13818-4: Information Technology—Generic Coding of Moving Pictures and Associated Audio Information—Part 4: Conformance testing," 79 pp. (1998).

ISO/IEC, "ISO/IEC 13818-1: Information Technology—Generic Coding of Moving Pictures and Associated Audio Information: Systems," 174 pp., (2000).

ISO/IEC, "ISO/IEC 13818-2: Information Technology—Generic Coding of Moving Pictures and Associated Audio Information: Video—Amendment 1: Content Description Data," 23 pp. (Document dated Dec. 2001).

ITU-T, "ITU-T Recommendation H.320: Infrastructure of Audiovisual Services—Systems and Terminal Equipment for Audiovisual Services: Narrow-band Visual Telephone Systems and Terminal Equipment," 31 pp. (1999).

Joint Video Team of ISO/IEC MPEG and ITU-T VCEG, "Study of Final Committee Draft of Joint Video Specification (ITU-T Rec. H.264, ISO/IEC 14496-10 AVC," 257 pp. (Document dated Dec. 2002) [Downloaded from the World Wide Web on May 6, 2005].

Joint Video Team of ISO/IEC MPEG and ITU-T VCEG, "Joint Model No. 1, Revision 1 (JM-1r1)," 80 pp. (Document dated Jan. 2002) [Downloaded from the World Wide Web on May 6, 2005].

Lei, "The construction of efficient variable-length codes with clear synchronizing codewords for digital video applications," *SPIE Visual Comm. & Image Processing '91: Visual Comm.*, vol. 1605, pp. 863-873 (1991).

Miranda Technologies, Inc., "TCP-101i: Time Code Processor and Remote Control Panel," 1 p. (Downloaded from the World Wide Web on Oct. 22, 2005).

Reader, "History of MPEG Video Compression—Ver. 4.0," 99 pp., document marked Dec. 16, 2003.

Schwalb, "iTV Food Chain," *Prentice Hall Professional Technical Reference*, 35 pp. (Oct. 2003) [Downloaded from the World Wide Web on Oct. 22, 2005].

Stockhammer et al., "H.26L/JVT Coding Network Abstraction Layer and IP-based Transport," *Proc. 2002 Int'l Conf. on Image Processing: ICIP 2002*, pp. 485-488 (Sep. 2002).

Sullivan, "Header-Level Needs for H.26L," ITU-T, Study Group 16, Questions 15/16, 6 pp. (Dec. 2001).

Sun, H., et al., "Architectures for MPEG Compressed Bitstream Scaling," *IEEE Transactions on Circuits and Systems for Video Technology*, vol. 6, No. 2, pp. 191-199 (Apr. 1996).

Suzuki et al., "Tool to Support Random Access," ITU-T, Study Group 16, Question 6, 3 pp. (Document dated Dec. 2001) [Downloaded from the World Wide Web on May 6, 2005].

Suzuki et al., "Group of Pictures for JVT Codec," ITU-T, Study Group 16, Question 6, 4 pp. (Document dated Jan. 2002) [Downloaded from the World Wide Web on May 6, 2005].

Suzuki, "AHG Report: GOP Syntax," ITU-T, Study Group 16, Question 6, 1 p. (Document dated Dec. 2002) [Downloaded from the World Wide Web on May 6, 2005].

Williams, "All in Good Timcode," *Adobe Magazine*, 3 pp. (Spring 1999).

Printouts of FTP directories from http://ftp3.itu.ch , 8 pp. (downloaded from the World Wide Web on Sep. 20, 2005.)

ISO/IEC, Draft ISO/IEC 11172-2, "Coding of Moving Pictures and Associated Audio for Digital Storage Media at up to About 1.5 Mbit/s," Part 2: Video, SS 2.4.2.5 (Nov. 1991).

Sullivan, "On Random Access and Bitstream Format for JVT Video," JVT-B063, 10 pp. (document marked Jan. 23, 2002).

Notice on Office Action dated Aug. 1, 2008, from Chinese Patent Application No. 200410095789.X, 19 pp.

Second Office Action dated Mar. 13, 2009, from Chinese Patent Application No. 200410095789.X, 11 pp.

Office action dated Aug. 1, 2008, from Chinese Patent Application No. 200410095789.X, 19 pp.

Office action dated Mar. 13, 2009, from Chinese Patent Application No. 200410095789.X, 11 pp.

Notice on Grant of Patent Right for Invention dated Sep. 4, 2009, from Chinese Patent Application No. 200410095789.X, 4 pp.

* cited by examiner

Software 180 implementing video encoder or decoder with entry point processing

Entry Point Signaled before an I frame (Progressive Picture Coding)

Entry Point Signaled before an I/P frame (Field Interlace Picture Coding)

Entry Point Signaled before an P/I frame (Field Interlace Picture Coding)

Entry Point Signaled before an I/I frame (Field Interlace Picture Coding)

Entry Point Signaled before an I frame (Frame Interlace Coding)

US 7,839,930 B2

SIGNALING VALID ENTRY POINTS IN A VIDEO STREAM

RELATED APPLICATION INFORMATION

This application claims the benefit of U.S. Provisional patent application Ser. No. 60/520,543, filed Nov. 13, 2003, the disclosure of which is incorporated herein by reference.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

Techniques and tools for coding/decoding digital video are described. For example, a video encoder uses described techniques and tools for defining and signaling valid entry points in a video stream.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel as a set of three samples totaling 24 bits. Thus, the number of bits per second, or bit rate, of a typical raw digital video sequence can be 5 million bits/second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which quality of the video does not suffer but decreases in bit rate are limited by the inherent amount of variability (sometimes called entropy) of the video data. Or, compression can be lossy, in which quality of the video suffers but achievable decreases in bit rate are more dramatic. Lossy compression is often used in conjunction with lossless compression—in a system design in which the lossy compression establishes an approximation of information and lossless compression techniques are applied to represent the approximation.

In general, video compression techniques include "intra-picture" compression and "inter-picture" compression, where a picture is, for example, a progressively scanned video frame. For progressive video frames, intra-frame compression techniques compress individual frames (typically called I-frames or key frames). Inter-frame compression techniques compress frames (typically called predicted frames, P-frames, or B-frames for bidirectional prediction) with reference to preceding and/or following frames (typically called reference or anchor frames).

I. Interlaced Video and Progressive Video

A typical interlaced video frame consists of two fields scanned starting at different times. For example, an interlaced video frame includes a top field and a bottom field. Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present because the two fields are scanned starting at different times. For this reason, interlaced video frames can be rearranged for coding according to a field structure, with the odd lines grouped together for coding as one field, and the even lines grouped together for coding as another field. This arrangement, known as field coding, is useful in high-motion pictures for reduction of such jagged edge artifacts. Fields in different field-coded interlaced frames can be coded differently. For example, a field in a field-coded interlaced frame can be intra-coded (e.g., an interlaced I-field) or inter-coded (e.g., an interlaced P-field or interlaced B-field).

On the other hand, in stationary regions, image detail in the interlaced video frame may be more efficiently preserved without such a coding rearrangement. Accordingly, frame coding is often used in stationary or low-motion interlaced video frames, in which the original alternating field line arrangement is preserved. Different frame-coded interlaced frames also can be coded differently. For example, such frames can be intra-coded (e.g., an interlaced I-frame) or inter-coded (e.g., an interlaced P-frame or interlaced B-frame).

A typical progressive video frame consists of one frame of content with non-alternating lines. In contrast to interlaced video, progressive video does not divide video frames into separate fields, and an entire frame is scanned left to right, top to bottom starting at a single time. Progressive frames can be intra-coded (e.g., a progressive I-frame) or inter-coded (e.g., a progressive P-frame or progressive B-frame).

II. Standards for Video Compression and Decompression

Several international standards relate to video compression and decompression. These standards include the Motion Picture Experts Group ["MPEG"] 1, 2, and 4 standards and the H.261, H.262 (another title for MPEG 2), H.263 and H.264 (also called JVT/AVC) standards from the International Telecommunication Union ["ITU"]. These standards specify aspects of video decoders and formats for compressed video information. Directly or by implication, they also specify certain encoder details, but other encoder details are not specified. These standards use (or support the use of) different combinations of intraframe and interframe decompression and compression. In particular, they use or support the use of different "access points" for decoders and/or editors.

The MPEG 2/H.262 standard describes intra-coded pictures (e.g., coded I-frames) and group-of-pictures (GOP) headers. In MPEG 2, intra-coded pictures are coded without reference to other pictures and provide access points to the coded sequence where decoding can begin. Intra-coded pictures can be used at different places in a video sequence. For example, intra-coded pictures can be inserted periodically or can be used in places such as scene changes or where motion compensation is otherwise ineffective. A coded I-frame is an I-frame picture or a pair of field pictures, where the first field picture is an I-picture and the second field picture is an I-picture or a P-picture. The MPEG 2 standard does not allow a coded I-frame in which the first field picture is a P-picture and the second field picture is an I-picture.

A GOP header is a construct in the MPEG 2 bitstream that signals the beginning of a group of pictures. Groups of pictures are typically used to signal the boundary of a set of video frames/fields all encoded with reference to the same I-frame. A GOP header is an optional header that may be signaled immediately before a coded I-frame to indicate if the first consecutive B-pictures (if any) immediately following the coded I-frame in the bitstream (but typically preceding the coded I-frame in display order) can be reconstructed properly in the case of a random access. For such B-pictures, if a reference picture before the current coded I-frame is not available, the B-pictures cannot be reconstructed properly unless they only use backward prediction from the current coded I-frame or intra coding. A decoder may use this information to avoid displaying B-pictures that cannot be correctly decoded. For a decoder, the GOP header thus indicates how the decoder can perform decoding from the GOP header, even if the GOP header is in the middle of a video sequence. The GOP header includes a start code called group_start_code. The GOP header start code includes a 24-bit start code prefix (23 0s followed by a 1) followed by the GOP header start code value (B8 in hexadecimal). Start codes in MPEG 2 are byte-aligned; 0s are to be inserted before the beginning of the start code prefix to ensure byte alignment. For additional information, see the H.262 standard.

The MPEG 4 standard describes intra-coded video object planes (I-VOPs) and group of video object plane (VOP) headers. An I-VOP is a VOP coded using information only from itself. Non-intra-coded VOPs may be derived from progressive or interlaced frames. In MPEG 4, I-VOPs are coded without reference to other pictures and provide access points to the coded sequence where decoding can begin. A group of VOP header is an optional header that can be used immediately before a coded I-VOP to indicate to the decoder if the first consecutive B-VOPs immediately following the coded I-frame can be reconstructed properly in the case of a random access. A group of VOP header must be followed by a coded I-VOP. A group of VOPs start code includes a 24-bit start code prefix (23 0s followed by a 1) followed by the group of VOPs start code value (B3 in hexadecimal). Start codes in MPEG 4 are byte-aligned and the standard provides for bit-stuffing to achieve byte alignment. For example, for stuffing from one to eight bits, a 0 followed by from one to seven is are inserted prior to the start code, so long as the previous code was not a start code. For additional information, see the MPEG 4 standard.

According to draft JVT-d157 of the JVT/AVC video standard, I-pictures provide access points to a coded sequence where decoding can begin, and various information used in decoding is signaled in network abstraction layer ("NAL") units. A NAL unit indicates what type of data to expect in the NAL unit, followed by the data itself, interspersed with emulation prevention data. A supplemental enhancement information ("SEI") NAL unit is a type of NAL unit. An SEI NAL unit contains one or more SEI messages. Each SEI message consists of SEI header and SEI payload. The type and size of the SEI payload are coded using an extensible syntax. The SEI payload may have a SEI payload header. For example, a payload header may indicate to which picture the particular data belongs.

Annex C of draft JVT-d157 establishes rules for dealing with hypothetical reference decoder ("HRD") buffers. For example, at each decoder refresh point a buffering period SEI message shall follow the last NAL unit of the last picture before a decoder refresh and precede the first NAL unit of the first picture after the decoder refresh. An HRD picture SEI message must follow the last NAL unit of each picture and precede the first NAL unit of the next picture. Each of these SEI messages pertains to the picture that follows it.

Annex D of the draft JVT-d157 describes a syntax for a random access point SEI message. A random access point SEI message contains an indicator of a random access entry point for a decoder. The entry point is indicated as a count relative to the position of the SEI message in units of coded frame numbers prior to the frame number of the current picture. Annex D states that a buffering period SEI message should be transmitted at the location of the random access entry point indicated in the random access point SEI message in order to establish initialization of the HRD buffer model.

These international standards are limited in several important ways. For example, in MPEG 2, the first coded frame after a GOP header must be a "coded I-frame"—an intra-coded frame picture or a pair of field pictures where the first field picture is an I-picture and the second field picture is either an I-picture or a P-picture. GOP headers are not allowed to precede any other frame type. In MPEG 4, a group of VOP header must be followed by a coded I-VOP.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for coding/decoding of digital video. In particular, described embodiments include techniques and tools for determining and signaling entry points in video streams.

Video compression typically relies on temporal correlation across video fields or video frames to compress video content efficiently. As a result, compression of video fields/frames introduces temporal dependence across these fields and frames. Techniques and tools described herein are used to embed entry point indicator information in the bitstream that receivers, editing systems or insertion systems can use to detect valid entry points in compressed video. The embedded information can be used, for example, in implementation of "trick" modes (e.g., fast forward, fast rewind, etc.) by allowing a video decoder to jump from one entry point or key frame to another. The various techniques and tools can be used in combination or independently.

Additional features and advantages will be made apparent from the following detailed description of different embodiments that proceeds with reference to the accompanying drawings.

DETAILED DESCRIPTION

The present application relates to techniques and tools for determining and signaling valid entry points in compressed video. In this context, "determining" can mean, for example, detecting whether a video frame is a valid entry point in the bitstream once it has been compressed, or enforcing rules or policies to guarantee production of valid entry points at compression time. A bitstream format or syntax includes flags and other codes to incorporate the techniques. The bitstream format comprises different layers or levels (e.g., sequence level, frame/picture/image level, macroblock level, and/or block level).

Described techniques and tools introduce conditions for a video frame or a video field to be a valid entry point in a bitstream. These conditions represent policies that a video encoder enforces during encoding of a video sequence to produce entry points in bitstreams (in order to enable "trick" modes, for example). The policies can produce entry points in the bitstream at different locations. For example, policies can direct entry points to be provided when a scene change occurs or to indicate where a commercial can be inserted to facilitate activities such as video summarization and splicing, respectively. The policies governing the insertion of entry points in the bitstream can also be designed such that entry points are provided at regular intervals and at specific time intervals (for example, to minimize latency upon tuning to the service). Described techniques and tools are also directed to the mechanisms by which entry points can be signaled unambiguously in an elementary stream. This can be achieved by a special start code followed by an entry header.

The various techniques and tools can be used in combination or independently. Different embodiments implement one or more of the described techniques and tools.

I. Computing Environment

Figure 1:
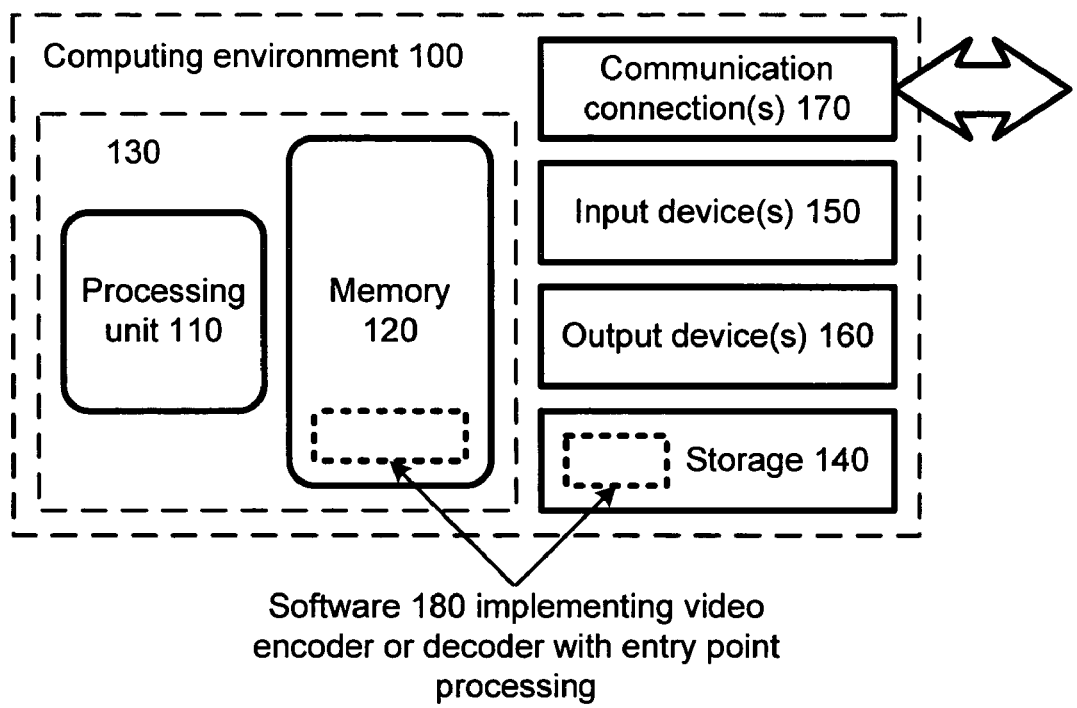
FIG. 1 is a block diagram of a suitable computing environment in which several described embodiments may be implemented.

FIG. 1 illustrates a generalized example of a suitable computing environment 100 in which several of the described embodiments may be implemented. The computing environment 100 is not intended to suggest any limitation as to scope of use or functionality, as the techniques and tools may be implemented in diverse general-purpose or special-purpose computing environments.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. The memory 120 stores software 180 implementing a video encoder or decoder with entry point processing.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, DVDs, or any other medium which can be used to store information and which can be accessed within the computing environment 100. The storage 140 stores instructions for the software 180 implementing the video encoder or decoder.

The input device(s) 150 may be a touch input device such as a keyboard, mouse, pen, or trackball, a voice input device, a scanning device, or another device that provides input to the computing environment 100. For audio or video encoding, the input device(s) 150 may be a sound card, video card, TV tuner card, or similar device that accepts audio or video input in analog or digital form, or a CD-ROM or CD-RW that reads audio or video samples into the computing environment 100. The output device(s) 160 may be a display, printer, speaker, CD-writer, or another device that provides output from the computing environment 100.

The communication connection(s) 170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, within the computing environment 100, computer-readable media include memory 120, storage 140, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "enforce," and "provide" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 2:
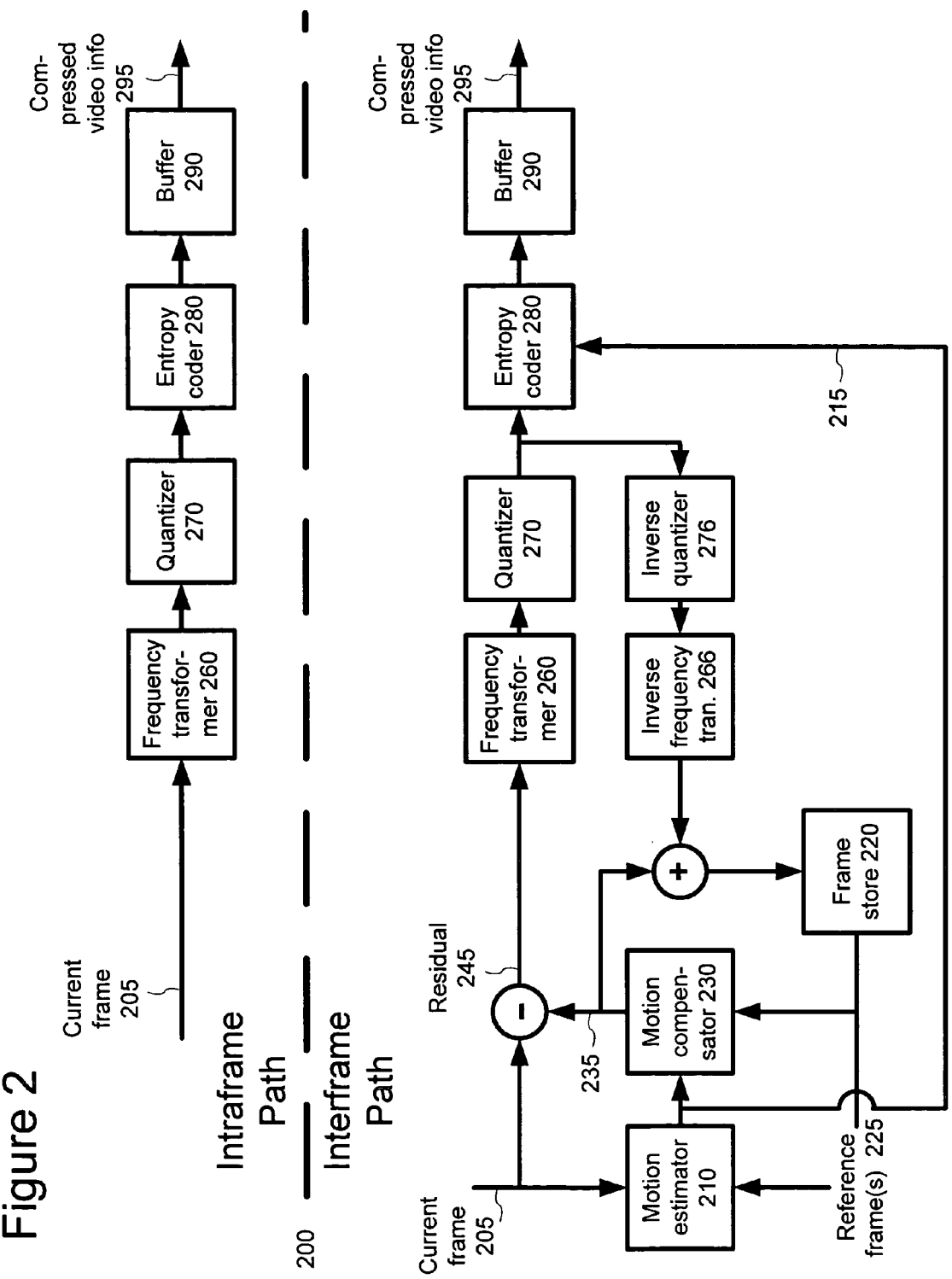
FIG. 2 is a block diagram of a generalized video encoder system used in several described embodiments.
Figure 3:
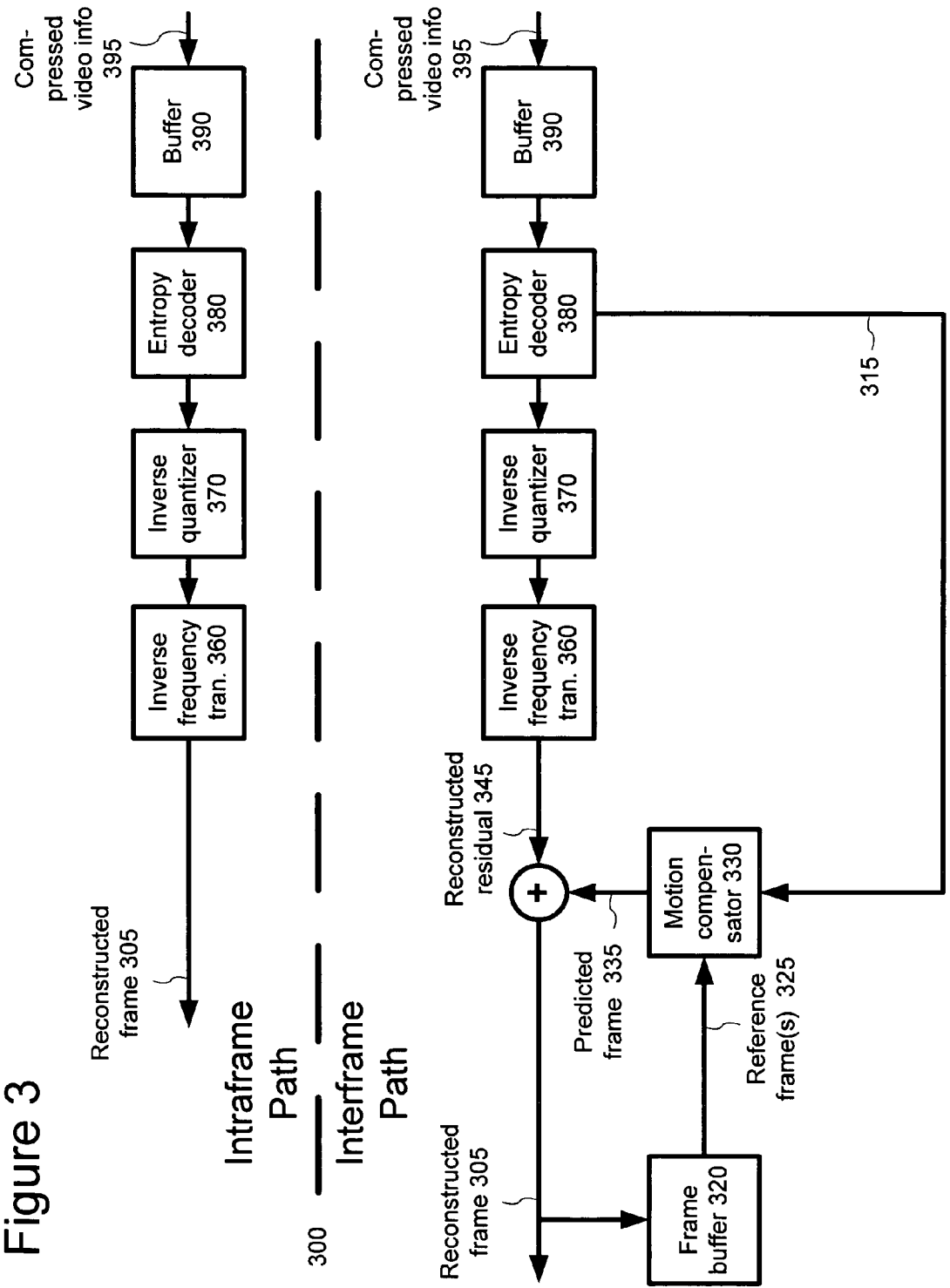
FIG. 3 is a block diagram of a generalized video decoder system used in several described embodiments.

FIG. 2 is a block diagram of a generalized video encoder 200 and FIG. 3 is a block diagram of a generalized video decoder 300.

The relationships shown between modules within the encoder and decoder indicate the main flow of information in the encoder and decoder; other relationships are not shown for the sake of simplicity. In particular, FIGS. 2 and 3 generally do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

The encoder 200 and decoder 300 are block-based and use a 4:2:0 macroblock format. Alternatively, the encoder 200 and decoder 300 are object-based or use a different macroblock or block format.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 2 is a block diagram of a general video encoder system 200. The encoder system 200 receives a sequence of video frames including a current frame 205, and produces compressed video information 295 as output. Particular embodiments of video encoders typically use a variation or supplemented version of the generalized encoder 200.

The encoder system 200 compresses predicted frames and key frames. For the sake of presentation, FIG. 2 shows a path for key frames through the encoder system 200 and a path for predicted frames. Many of the components of the encoder system 200 are used for compressing both key frames and predicted frames. The exact operations performed by those components can vary depending on the type of information being compressed.

A predicted frame (also called P-frame, B-frame for bidirectional prediction, or inter-coded frame) is represented in terms of prediction (or difference) from one or more reference (or anchor) frames. A prediction residual is the difference between what was predicted and the original frame. In contrast, a key frame (also called I-frame, intra-coded frame) is compressed without reference to other frames. Intra-coded frames include progressive I-frames, interlaced I-frames (frame interlaced mode), and I/I frames (field interlaced mode). Parts of other frames also can be compressed without reference to other frames. For example, the I-fields of I/P-frames and P/I frames are compressed without reference to other frames and are described in detail below. In some cases, the P-fields of I/P frames are compressed without reference to other frames, as described in detail below.

If the current frame 205 is a forward-predicted frame, a motion estimator 210 estimates motion of macroblocks or other sets of pixels of the current frame 205 with respect to a reference frame, which is the reconstructed previous frame 225 buffered in a frame store (e.g., frame store 220). If the current frame 205 is a bi-directionally-predicted frame (a B-frame), a motion estimator 210 estimates motion in the current frame 205 with respect to two reconstructed reference frames. Typically, a motion estimator estimates motion in a B-frame with respect to a temporally previous reference frame and a temporally future reference frame.

The motion estimator 210 outputs as side information motion information 215 such as motion vectors. A motion compensator 230 applies the motion information 215 to the reconstructed frame(s) 225 to form a motion-compensated current frame 235. The prediction is rarely perfect, however, and the difference between the motion-compensated current frame 235 and the original current frame 205 is the prediction residual 245. Alternatively, a motion estimator and motion compensator apply another type of motion estimation/compensation.

A frequency transformer 260 converts the spatial domain video information into frequency domain (i.e., spectral) data. A quantizer 270 then quantizes the blocks of spectral data coefficients. In addition to quantization, the encoder 200 can use frame dropping, adaptive filtering, or other techniques for rate control.

When a reconstructed current frame is needed for subsequent motion estimation/compensation, an inverse quantizer 276 performs inverse quantization on the quantized spectral data coefficients. An inverse frequency transformer 266 then performs the inverse of the operations of the frequency transformer 260, producing a reconstructed prediction residual (for a predicted frame) or a reconstructed key frame. If the current frame 205 was a key frame, the reconstructed key frame is taken as the reconstructed current frame (not shown). If the current frame 205 was a predicted frame, the reconstructed prediction residual is added to the motion-compensated current frame 235 to form the reconstructed current frame. A frame store (e.g., frame store 220) buffers the reconstructed current frame for use in predicting another frame.

The entropy coder 280 compresses the output of the quantizer 270 as well as certain side information (e.g., motion information 215, quantization step size). Typical entropy coding techniques include arithmetic coding, differential coding, Huffman coding, run length coding, LZ coding, dictionary coding, and combinations of the above.

The entropy coder 280 puts compressed video information 295 in the buffer 290. A buffer level indicator is fed back to bit rate adaptive modules. The compressed video information 295 is depleted from the buffer 290 at a constant or relatively constant bit rate and stored for subsequent streaming at that bit rate. Therefore, the level of the buffer 290 is primarily a function of the entropy of the filtered, quantized video information, which affects the efficiency of the entropy coding. Alternatively, the encoder system 200 streams compressed video information immediately following compression, and the level of the buffer 290 also depends on the rate at which information is depleted from the buffer 290 for transmission.

Before or after the buffer 290, the compressed video information 295 can be channel coded for transmission over the network. The channel coding can apply error detection and correction data to the compressed video information 295.

B. Video Decoder

FIG. 3 is a block diagram of a general video decoder system 300. The decoder system 300 receives information 395 for a compressed sequence of video frames and produces output including a reconstructed frame 305. Particular embodiments of video decoders typically use a variation or supplemented version of the generalized decoder 300.

The decoder system 300 decompresses predicted frames and key frames. For the sake of presentation, FIG. 3 shows a path for key frames through the decoder system 300 and a path for predicted frames. Many of the components of the decoder system 300 are used for decompressing both key frames and predicted frames. The exact operations performed by those components can vary depending on the type of information being decompressed.

A buffer 390 receives the information 395 for the compressed video sequence and makes the received information available to the entropy decoder 380. The buffer 390 typically receives the information at a rate that is fairly constant over time, and includes a jitter buffer to smooth short-term variations in bandwidth or transmission. The buffer 390 can include a playback buffer and other buffers as well. Alternatively, the buffer 390 receives information at a varying rate. Before or after the buffer 390, the compressed video information can be channel decoded and processed for error detection and correction.

The entropy decoder 380 entropy decodes entropy-coded quantized data as well as entropy-coded side information (e.g., motion information 315, quantization step size), typically applying the inverse of the entropy encoding performed in the encoder.

A motion compensator 330 applies motion information 315 to one or more reference frames 325 to form a prediction 335 of the frame 305 being reconstructed. For example, the motion compensator 330 uses a macroblock motion vector to find a macroblock in a reference frame 325. A frame buffer (e.g., frame buffer 320) stores previously reconstructed frames for use as reference frames. Typically, B-frames have more than one reference frame (e.g., a temporally previous reference frame and a temporally future reference frame). The prediction by the motion compensator is rarely perfect, so the decoder 300 also reconstructs prediction residuals.

When the decoder needs a reconstructed frame for subsequent motion compensation, a frame buffer (e.g., frame buffer 320) buffers the reconstructed frame for use in predicting another frame.

An inverse quantizer 370 inverse quantizes entropy-decoded data. An inverse frequency transformer 360 converts the quantized, frequency domain data into spatial domain video information.

III. Determining and Signaling Valid Entry Points

Valid entry points in a bitstream are locations in an elementary bitstream from which a system (e.g., a receiver, a video splicer, a commercial insertion tool, a video editor, a summarization engine, etc.) can decode or process the bitstream without the need of any preceding information (bits) in the bitstream. Frames that can be decoded without reference to preceding frames are typically referred to as "key" frames.

An entry point is signaled in a bitstream by an entry point indicator. The purpose of an entry point indicator is to signal the presence of a special location in a bitstream to begin or resume decoding (e.g., where there is no dependency on past decoded video fields or frames to decode the video frame following immediately the entry point indicator). Entry point indicators can be inserted at regular or irregular intervals in a bitstream. Therefore, an encoder can adopt different policies to govern the insertion of entry point indicators in a bitstream.

Figure 4:
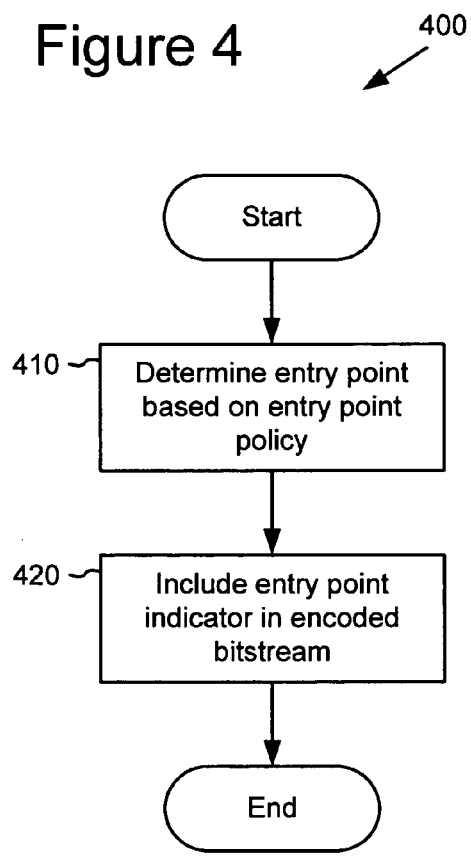
FIG. 4 is a flow chart showing a technique for determining and indicating entry points in a bitstream.
Figure 5:
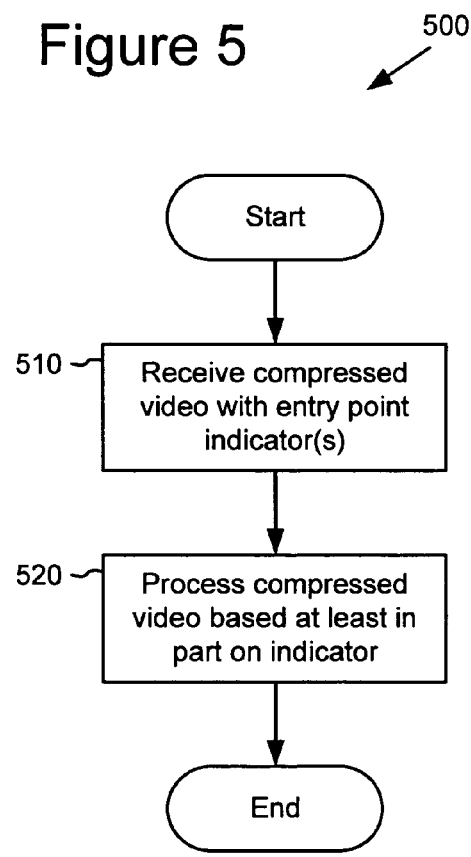
FIG. 5 is a flow chart showing a technique for processing a compressed video bitstream having entry point indicators.

FIG. 4 is a flow chart showing a technique 400 for determining and indicating entry points in a bitstream. At 410, an entry point is determined in a bitstream based on an entry point policy. Then, at 420, an entry point indicator is included in an encoded bitstream. FIG. 5 is a flow chart showing a technique 500 for processing (e.g., in a video decoder) a compressed video bitstream having entry point indicators. At 510, compressed video with one or more entry point indicators is received (e.g., by a video decoder, video editor, splicer, etc.). Then, at 520, the compressed video is processed based at least in part on the one or more entry point indicators.

As an example, an entry point indicator can comprise an entry point start code and an entry point header.

In some implementations, entry point start codes signal entry points in the bitstream. Entry point start codes can consist of a special 32-bit code that is not emulated anywhere else in the bitstream. For example, entry point start codes can take the form of a unique sequence of 32 bits, where the first three bytes are 0x000001 and the last byte identifies the start code the entry start code. However, more compact representations of the start code are allowed if the underlying transport includes enough signaling to provide similar information. For example, the entry point start code can be an abbreviated start code (e.g., one byte or a few bits) sufficient to distinguish the entry point start code from other kinds of start codes in the video stream. In some implementations, an entry point start code is located after the last of a video frame and before the beginning of the next video frame.

Entry point start codes can be used along with other start codes in a bitstream, such as sequence start codes, frame start code, field start codes, slice start codes, and user data start codes. Each type of start code can be a 32-bit field. The various types of start codes can have different last bytes that identify the start code as a sequence start code, frame start code, field start code, slice start code, user data start code, etc.

A start code may be preceded by an arbitrary number of "0"-valued bits, themselves preceded by a "1"-valued bit. The purpose of using a "10 . . . 0" flushing bits sequence between the last of the previous structure and the beginning of a start code is to allow consecutive start codes to be separated by an integer number of bytes, thereby facilitating parsing of start codes by receivers. Before the start code and after the last '0'-valued flushing bit, it is also possible to add an arbitrary number of 0x00-valued bytes.

In some implementations, an entry point start code is followed immediately by an entry point header. If there is a need to insert an entry point start code and an entry point header in a position in the bitstream where there are already a sequence start code and sequence header between two consecutive video frames, the entry point start code and the entry point header follow the sequence start code and sequence header.

Since an entry point start code and an entry point header may be inserted at regular or irregular intervals in a bitstream, an encoder can adopt different policies to govern the insertion of entry point start codes and associated headers.

IV. Examples

In some implementations, an entry point start code and associated header signal a valid entry point in the bitstream. Put differently, the entry point start code and/or header signals the presence of a special location in a bitstream where there is no dependency on decoded video fields or frames prior to (in time order) the key frame after the entry point start code and header to decode the video frame(s) following immediately (in time order) the key frame after the entry point start code and header. Thus, frames that can follow entry point key frames include both frames which can themselves be entry point frames (e.g., progressive I-frames, frame interlaced I-frames, field interlaced I/I frames, field interlaced I/P frames, field interlaced P/I frames, etc.) and predicted frames, subject to certain conditions described below. The conditions for achieving this are listed in the examples below with reference to FIGS. 6-10. Video frames and/or fields must satisfy certain conditions, depending on the type of picture. These conditions are only examples. Other conditions could be used.

These conditions depend on the type of the first frames/fields after the entry point. In these examples, the type of the first frame following an entry point start code header is I if picture coding type is set to progressive or frame interlace. If the picture coding type is set to field interlace, the type of the first two fields following an entry point start code and header is I/P (I and P), P/I (P and I), or I/I (I and I).

FIGS. 6-10 reference certain bitstream constructs, definitions of which can be found in the following list:
SEQ_SC: Sequence Start Code
SEQ_HDR: Sequence Header
ENTRY_SC: Entry Point Start Code
ENTRY_HDR: Entry Point Header
FRAME_SC: Frame Start Code
FRAME_HDR: Frame Header
FIELD_SC: Field Start Code
FIELD_HDR: Field Header
UD_SC: User Data Start Code
UD_BYT: User Data Bytes In addition, FIGS. 6-10 refer to an FCM field. FCM is a variable-size field indicating the type of the picture coding used for the video frame. The value "0" indicates that the picture coding type is "progressive." The value "10" indicates that the frame is encoded as "field interlaced." In a field interlaced picture, a frame is comprised of two distinct video fields, a top field and a bottom field, which are typically roughly 15 milliseconds apart. The value "11" indicates a "frame interlaced" type picture. In a frame interlaced picture, an interlaced video frame is comprised of macroblocks in either field mode or frame mode. This is useful for situations where there is a lot of foreground motion in reduced areas in the picture (coded in field mode as separate fields within macroblocks) while the background is static (and coded in frame mode as interlaced lines within macroblocks). The FCM value correlates with the title of each respective Figure. The conditions for valid entry points differ depending on how the picture has been encoded (progressive, field interlaced or frame interlaced). The I, P, or B type for frames and fields may be signaled in the respective headers for the frames and fields. For example, for a field interlaced mode frame, the picture type for the first field is signaled in the frame or field header preceding the first field data, and the picture type for the second field is signaled in the field header preceding the second field data. Alternatively, a field in the frame header indicates the combination of field types for the pair of fields, for example, I/I, P/I, or I/P.

The following diagrams and discussion incorporate certain rules for positions of reference fields and frames. In general, the reference frame for a progressive P-frame is the first I- or P-frame preceding the frame, and the reference frame(s) for a progressive B-frame may further include the first I- or P-frame following the frame. Similar rules apply for frame interlaced mode P-frames and B-frames. For field interlaced frames, the reference field(s) for a P-field are, for example, one or both of the first I- or P-fields preceding the field. The reference field(s) for a B-field are, for example, the two temporally preceding fields and two temporally subsequent fields.

A. I-frame in Progressive Mode

Figure 6:
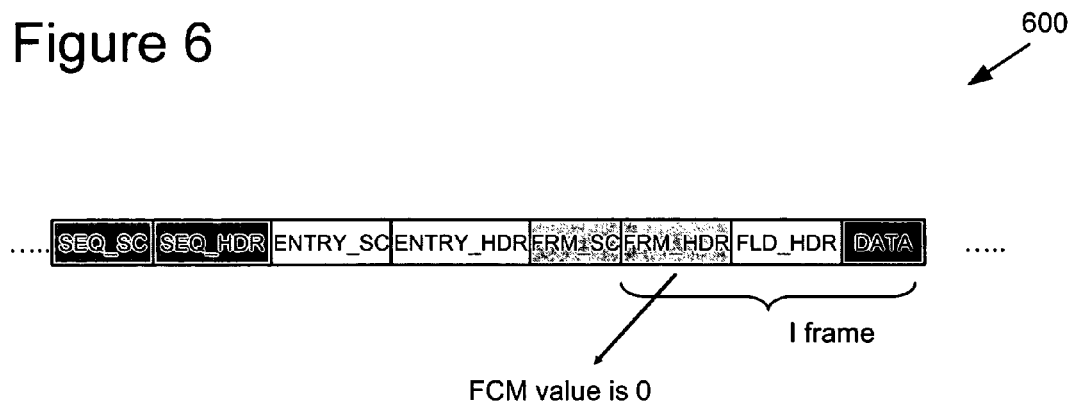
FIG. 6 is a diagram showing a bitstream syntax for signaling an entry point before a progressive I frame.

FIG. 6 illustrates how an entry point start code and header can be present before an I-frame when the picture coding type (FCM field) is set to the binary value "0" (progressive mode). FIG. 6 also shows a sequence start code and a sequence header before the entry point start code, but this is not a requirement. An entry point start code need not always be preceded by such structures.

Since the frame is intra-coded, no additional condition is needed to make this I-frame a valid entry point in a bitstream. The entry point applies to the I-frame that follows the entry point start code and header. It does not apply to any B-frame data or B-field data that follow that I-frame in the bitstream and for which the presentation time is earlier than the presentation time for that I-frame.

B. I/P-frame in Field Interlace Mode

Figure 7:
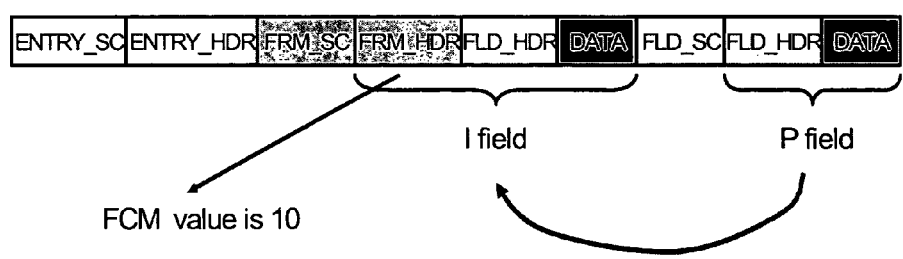
FIG. 7 is a diagram showing a bitstream syntax for signaling an entry point before an I/P frame.

FIG. 7 illustrates how an entry point start code and header can be present before an I/P-frame when the picture coding type (FCM field) is set to the binary value "10" (field interlace mode). FIG. 7 does not show a sequence start code and a sequence header before the entry point start code, but it may be the case that such structures precede the entry point start code.

Since the frame is made of an I-field followed by a P-field, the following conditions shall be met to make this I/P frame a valid entry point in a bitstream:
  The value of the "numref" field in the field header of the P-field of the entry I/P-frame shall be the binary value "0".
  The value of the "reffield" field in the field header of the P-field of the entry I/P-frame shall be the binary value "0".

These conditions ensure that the P-field is only predicted from the I-field, and therefore there is no dependency on frames or fields before the entry point. (In other words, the "numref" (number of references) field indicates the number of reference fields for the P-field is one (numref=0), and the "reffield" (reference field) field indicates the one reference field for the P-field is the temporally closest field—the I-field (reffield=0)).

The entry point applies to the I/P-frame that follows the entry point start code and header but it does not apply to any B-frame data or B-field data that follow that I/P-frame in the bitstream and for which the presentation time comes earlier than the presentation time for that I/P-frame.

C. P/I frame in Field Interlace Mode

Figure 8:
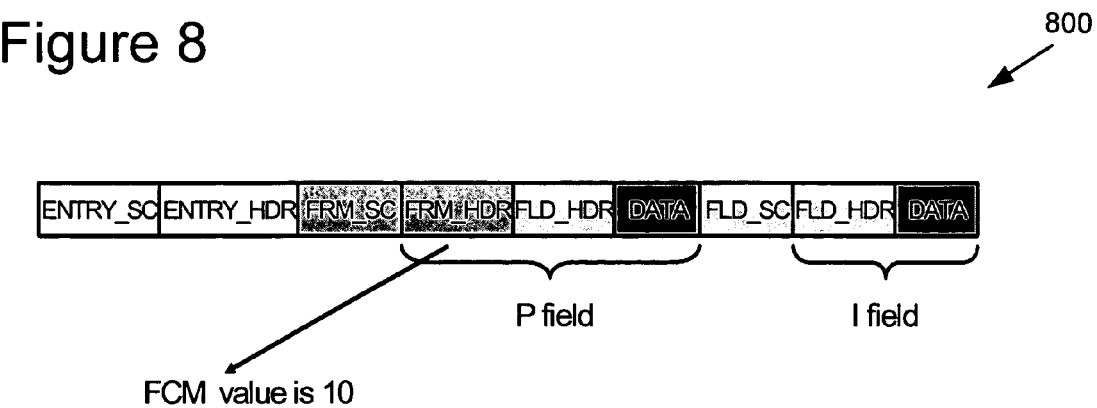
FIG. 8 is a diagram showing a bitstream syntax for signaling an entry point before a P/I frame.

FIG. 8 illustrates how an entry point start code and header can be present before a P/I-frame when the picture coding type (FCM field) is set to the binary value "10" (field interlace mode). FIG. 8 does not show a sequence start code and a sequence header before the entry point start code, but it may be the case that such structures precede the entry point start code.

Since the frame is made of a P-field followed by an I-field, the following conditions shall be met to make this P/I-frame a valid entry point in a bitstream:
  Following the entry I-field of the P/I frame, a P/P-frame in field interlace mode shall be present in the bitstream before any occurrence of P-frames in progressive or frame interlaced modes.
  The value of the "numref" field in the field header of the first P-field following the entry P/I-frame shall be the binary value "0".
  The value of the "reffield" field in the field header of the first P-field following the entry P/I-frame shall be the binary value "0".
  Any B-frames following the entry P/I-frame in the bitstream and for which the presentation time comes later than the presentation times for that entry P/I-frame shall not be encoded as depending on the P/I-frame.

The first (in temporal order) B-field of any B/B-frames following the entry P/I-frame in the bitstream and for which the presentation time comes later than the presentation times of that P/I-frame shall not be encoded as depending on the P-field of the entry P/I-frame.

These conditions ensure that the next P/P-frame and B/B-frames in the bitstream may be predicted from the entry I-field but not the P-field that immediately precedes it. Note also that it is impossible to have a valid entry point here if there is a P-frame that has been predicted from the P/I-frame, since this would create a dependency on the P-field of the entry P/I-frame.

The entry point applies to the I-field that follows the entry point start code and header but it does not apply to any B-frame data that follows that I-field in the bitstream and for which the presentation time is earlier than the presentation time for that I-field. Furthermore, the entry point does not apply to the P-field data located between the entry point start code and the following I-field of the entry P/I frame.

D. I/-frame in Field Interlace Mode

Figure 9:
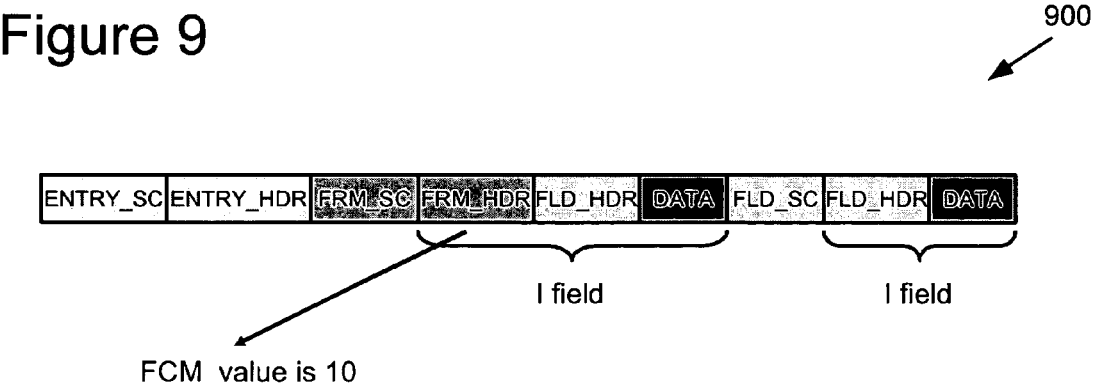
FIG. 9 is a diagram showing a bitstream syntax for signaling an entry point before an I/I frame.

FIG. 9 illustrates how an entry point start code and header can be present before an I/I-frame when the picture coding type (FCM field) is set to the binary value "10" (field interlace mode). FIG. 9 does not show a sequence start code and a sequence header before the entry point start code, but it may be the case that such structures precede the entry start code.

Since the I/I-frame is made of two I-fields, no additional condition is needed to make this frame a valid entry point in a bitstream.

The entry point applies to the I/I-frame that follows the entry point start code and header, but it does not apply to any B-frame data or B-field data that follows that I/I-frame in the bitstream and for which the presentation times come earlier than the presentation time for that I/I-frame.

E. I-frame in Frame Interlace Mode

Figure 10:
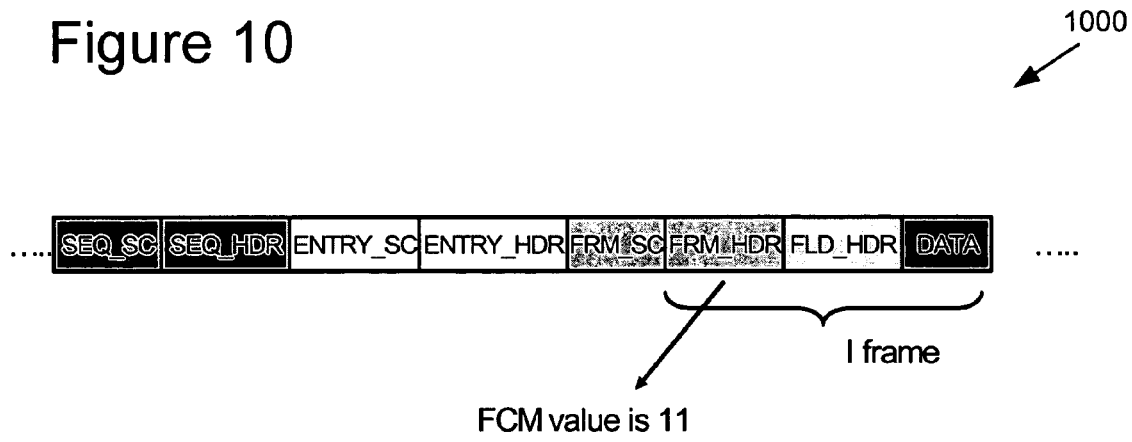
FIG. 10 is a diagram showing a bitstream syntax for signaling an entry point before an interlace I frame.

FIG. 10 illustrates how an entry point start code and header can be present before an I-frame when the picture coding type (FCM field) is set to the binary value "11" (frame interlace mode). FIG. 10 also shows a sequence start code and a sequence header before the entry point start code, but it is not a requirement that an entry start code be always preceded by such structures.

Since the frame is intra-coded, no additional condition is needed to make this I-frame a valid entry point in a bitstream. The entry point applies to the I-frame that follows the entry point start code and header, but it does not apply to any B-frame data or B-field data that follows that I-frame in the bitstream and for which the presentation times come earlier than the presentation time for that I-frame.

V. Extensions

In conjunction with or in addition to the various alternatives described above, the encoder and decoder may operate as follows.

Policies assess whether a point in a bitstream is a valid entry point. An encoder can use a policy that defines scene changes as valid entry points (and therefore ensures that the compression engine yields one of the constraints described above). In this case, scene changes can be detected by means of a scene change detector component that can interface (communicate) with the encoder in real time. Encoders can additionally use policies for generating I-frames or I-fields at particular time intervals.

An encoder can also monitor the type and properties of the compressed video it produces and detect the points in the bitstream that verify one of the conditions such as those described in the examples for I-, I/P-, P/I- and I/I-frames stated above. Upon detecting such an event, the encoder can insert an entry point start code and an entry point header in the final bitstream.

In modes such as fast-forward or fast-rewind, a video decoder could search for and render entry point frames by searching for entry point start codes.

Entry points can be utilized by an application to produce and display a summarized version (thumbnails) of a video sequence directly from the compressed bitstream. Such an application can be a video editing application or a digital television electronic program guide.

For performing video splicing, a video splicer could search for entry points to find scene changes at which splicing would be appropriate.

The entry point header can contain information on buffer status. This information indicates buffer status that needs to be achieved to avoid buffer underflow or overflow. The buffer status information is stored in a field in the entry header. For example, putting buffer fullness requirement information into the entry header lets the decoder know what the minimum fullness of the buffer should be achieved before decoding can begin.

In several examples above, an entry point does not apply to B-frame or B-field data that follow the entry I-frame or I-field in the bitstream and for which the presentation time is earlier than the presentation time for the I-frame or I-field. Alternatively, the entry point does apply to such B-frame or B-field data if the B-frame or B-field data is intra coded or predicted only from the entry point I-frame or I-field.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computing device that implements a video encoder, a method comprising:

with the computing device that implements the video encoder, determining one or more entry points for a sequence comprising plural video frames based at least in part on an entry point policy; and with the computing device that implements the video encoder, inserting in a bitstream an entry point indicator that indicates a first frame of the plural frames is one of the one or more entry points, wherein the first frame is a field interlaced P/I-frame comprising a P-field followed by an I-field, the P-field and the I-field being arranged in the bitstream for decoding as individual fields, wherein a second frame immediately follows the field interlaced P/I-frame in presentation time, wherein the second frame is a predicted frame, wherein according to the entry point policy the video encoder makes coding decisions for the second frame to remove any motion compensation dependencies prior to the I-field of the field interlaced P/I-frame, and wherein the entry point policy comprises conditions that include:
  after the field interlaced P/I-frame, at least one field interlaced P/P-frame is present in the bitstream before a progressive P-frame or frame interlaced P-frame;
  after the field interlaced P/I-frame, a next P-field in the bit stream references the I-field of the field interlaced P/I-frame but not the P-field of the field interlaced P/I-frame;
  after the field interlaced P/I-frame, a progressive B-frame or frame interlaced B-frame in the bitstream that has a later presentation time than the field interlaced P/I-frame is not encoded depending on the field interlaced P/I-frame; and
  after the field interlaced P/I-frame, a next B-field in the bitstream that has a later presentation time than the field interlaced P/I-frame is not encoded depending on the P-field of the field interlaced P/I-frame.

2. The method of claim 1 wherein the one or more entry points comprises plural entry points positioned at different intervals.

3. The method of claim 1 wherein the entry point indicator comprises an entry point header.

4. The method of claim 3 wherein the entry point header includes buffer fullness information.

5. The method of claim 1 wherein the entry point indicator comprises an entry point start code.

6. The method of claim 5 wherein the entry point start code is an abbreviated start code sufficient to distinguish the entry point start code from other start codes in the bitstream.

7. The method of claim 1 wherein the bitstream has plural syntax levels, and wherein the entry point indicator is included at a syntax level below sequence level.

8. The method of claim 7 wherein the syntax level below sequence level is entry point level.

9. The method of claim 1 wherein the entry point indicator immediately follows a sequence header in the bitstream.

10. The method of claim 1 wherein the entry point indicator indicates a commercial insertion point to facilitate video splicing.

11. The method of claim 1 wherein, due to designation of the field interlaced P/I-frame as an entry point, a field of the second frame that might otherwise use the P-field of the field interlaced P/I-frame as a reference field in motion compensation is constrained to not use the P-field of the field interlaced P/I-frame as a reference field in motion compensation.

12. The method of claim 11 wherein, due to the designation of the field interlaced P/I-frame as an entry point, the second frame is constrained to be a P/P-frame instead of a progressive P-frame or interlaced P-frame referencing the entire field interlaced P/I-frame.

13. The method of claim 1 wherein the coding decisions include frame coding type of the second frame, picture type for the second frame, and reference picture selection for motion compensation for the second frame.

14. The method of claim 1 wherein a B-field in the sequence precedes the field interlaced P/I-frame in presentation time but follows the field interlaced P/I frame in coded order and uses the P-field of the field interlaced P/I-frame as a reference field.

15. The method of claim 1 wherein a B-frame in the sequence precedes the field interlaced P/I-frame in presentation but follows the field interlaced P/I frame in coded order and uses the field interlaced P/I-frame as a reference frame.

16. In a computing device that implements a video decoder, a method comprising:
  receiving, at the computing device that implements the video decoder, a bitstream for a sequence comprising plural video frames, each of the plural video frames having a frame coding type, wherein the frame coding type for each of the plural video frames is one of progressive, field interlaced, and frame interlaced;
  with the computing device that implements the video decoder, detecting an entry point indicator in the bitstream, wherein the entry point indicator marks a first frame of the plural frames as an entry point for decoding and is positioned in the bitstream according to an entry point policy; and
  with the computing device that implements the video decoder, decoding at least a portion of the bitstream based at least in part on the entry point indicator;
  wherein the entry point policy comprises one or more conditions for entry point indicator positioning, wherein the first frame is a field interlaced P/I-frame comprising a P-field followed by an I-field, the P-field and the I-field being arranged in the bitstream for decoding as individual fields, wherein a second frame immediately follows the field interlaced P/I-frame in presentation time, and wherein the frame coding type of the second frame depends in part on the field interlaced P/I frame being an entry point; and
  wherein the one or more conditions of the entry point policy comprise:
    after the field interlaced P/I-frame, at least one field interlaced P/P-frame is present in the bitstream before a progressive P-frame or frame interlaced P-frame;
    after the field interlaced P/I-frame, a next P-field in the bit stream references the I-field of the field interlaced P/I-frame but not the P-field of the field interlaced P/I-frame;
    after the field interlaced P/I-frame a progressive B-frame or, frame interlaced B-frame in the bitstream that has a later presentation time than the field interlaced P/I-frame is not encoded depending on the field interlaced P/I-frame; and
    after the field interlaced P/I-frame, a next B-field in the bitstream that has a later presentation time than the field interlaced P/I-frame is not encoded depending on the P-field of the field interlaced P/I-frame.

17. The method of claim 16 wherein the bitstream comprises plural syntax levels, and wherein the entry point indicator is at a syntax level below sequence level.

18. The method of claim 17 wherein the syntax level below sequence level is entry point level.

19. The method of claim 16 wherein the entry point indicator comprises an entry point start code and an entry point header.

20. The method of claim 16, the one or more conditions further comprising:
  a frame interlaced P-frame following the field interlaced P/I-frame is not predicted from the field interlaced P/I-frame.

21. The method of claim 16 wherein a frame following the field interlaced P/I-frame is a frame selected from the set comprising: frame interlaced I-frame, field interlaced I/P-frame, field interlaced I/I-frame, progressive I-frame and field interlaced P/I-frame.

22. The method of claim 16 further comprising, with the computing device that implements the video decoder, producing a summarized version of the sequence based at least in part on the entry point.

23. The method of claim 22 wherein the producing a summarized version is performed via a video editing application.

24. The method of claim 16 wherein the decoding is performed in a trick mode.

25. The method of claim 24 wherein the trick mode is fast rewind mode.

26. The method of claim 24 wherein the trick mode is fast forward mode.

27. The method of claim 16 wherein, due to designation of the field interlaced P/I-frame as an entry point, a field of the second frame that might otherwise use the P-field of the field interlaced P/I-frame as a reference field in motion compensation is constrained to not use the P-field of the field interlaced P/I-frame as a reference field in motion compensation.

28. The method of claim 27 wherein, due to the designation of the field interlaced P/I-frame as an entry point, the second frame is constrained to be a P/P-frame instead of a progressive P-frame or interlaced P-frame referencing the entire field interlaced P/I-frame.

29. The method of claim 16 wherein the second frame is a predicted frame, and wherein one or more picture types for the second frame and reference picture selection for motion compensation for the second frame also depend in part on the field interlaced P/I frame being an entry point.

30. The method of claim 16 wherein a B-field in the sequence precedes the field interlaced P/I-frame in presentation but follows the field interlaced P/I frame in coded order and uses the P-field of the field interlaced P/I-frame as a reference field.

31. The method of claim 16 wherein a B-frame in the sequence precedes the field interlaced P/I-frame in presentation but follows the field interlaced P/I frame in coded order and uses the field interlaced P/I-frame as a reference frame.

32. In a computing device that implements a video decoder, a method comprising:
  receiving, at the computing device that implements the video decoder, a bitstream for a sequence comprising plural video frames;
  with the computing device that implements the video decoder, detecting an entry point indicator in the bitstream, wherein a first frame immediately following the entry point indicator is decodable without reference to any frames preceding the entry point indicator in the bitstream, wherein the first frame is a field interlaced P/I-frame comprising a P-field followed by an I-field, the P-field and the I-field being arranged in the bitstream for decoding as individual fields; and
  with the computing device that implements the video decoder, decoding at least a portion of the bitstream based at least in part on the entry point indicator, wherein, due to designation of the field interlaced P/I-frame as an entry point, a field following the field interlaced P/I-frame that might otherwise use the P-field of the field interlaced P/I-frame as a reference field in motion compensation is constrained to not use the P-field of the field interlaced P/I-frame as a reference field in motion compensation, and wherein the bitstream complies with the following conditions:
    after the field interlaced P/I-frame. at least one field interlaced P/P-frame is present in the bitstream before a progressive P-frame or frame interlaced P-frame;
    after the field interlaced P/I-frame, a next P-field in the bit stream references the I-field of the field interlaced P/I-frame but not the P-field of the field interlaced P/I-frame;
    after the field interlaced P/I-frame, a progressive B-frame or frame interlaced B-frame in the bitstream that has a later presentation time than the field interlaced P/I-frame is not encoded depending on the field interlaced P/I-frame; and
    after the field interlaced P/I-frame, a next B-field in the bitstream that has a later presentation time than the field interlaced P/I-frame is not encoded depending on the P-field of the field interlaced P/I-frame.

33. The method of claim 32 wherein the detecting the entry point indicator comprises detecting an entry point start code.

34. The method of claim 32 wherein the entry point indicator comprises an entry point start code and an entry point header.

35. The method of claim 34 wherein the entry point header comprises buffer fullness information.

36. In a computing device that implements a video decoder, a method comprising:
  receiving, at the computing device that implements the video decoder, a bitstream for a sequence comprising plural video frames; and
  with the computing device that implements the video decoder, decoding starting from an entry point signaled by an entry point indicator in the bitstream, wherein the entry point is a field interlaced P/I-frame comprising a P-field followed by an I-field within the plural video frames, wherein after he entry point indicator the bitstream includes the following elements for the entry point: frame header, first field header, first field data, second field header, and second field data, and wherein the first field header and the first field data are for the P-field and the second field header and the second field data are for the I-field, the frame header being organized according to a different bitstream syntax than the first and second field headers.

37. The method of claim 36 wherein the bitstream further includes a frame start code immediately before the frame header and a field start code immediately before the second field header.

38. The method of claim 36 wherein the entry point indicator includes an entry point start code and an entry point header.

* * * * *